United States Patent
Trunov (10) Patent No.: US 10,873,388 B2
(45) Date of Patent: Dec. 22, 2020

(54) SYSTEM, DEVICE AND METHOD FOR SWITCHING AIR-TO-GROUND ANTENNAS

(71) Applicant: BOMBARDIER INC., Dorval (CA)

(72) Inventor: Nikolay Trunov, Mont-Royal (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/437,376

(22) Filed: Jun. 11, 2019

(65) Prior Publication Data

US 2019/0379444 A1 Dec. 12, 2019

Related U.S. Application Data (60) Provisional application No. 62/683,926, filed on Jun. 12, 2018.

(51) Int. Cl.
| | |
|---|---|
| *H04W 4/00* | (2018.01) |
| *H04B 7/185* | (2006.01) |
| *H01Q 1/28* | (2006.01) |
| *H04W 84/00* | (2009.01) |

(52) U.S. Cl.
CPC .......... *H04B 7/18506* (2013.01); *H01Q 1/28* (2013.01); *H04W 84/005* (2013.01)

(58) Field of Classification Search
CPC .... H01Q 1/28; H04B 7/18506; H04W 84/005
See application file for complete search history.

(56) References Cited

U.S. PATENT DOCUMENTS

| | | |
|---|---|---|
| 7,107,062 B2 | 9/2006 | Cruz et al. |
| 7,113,780 B2 | 9/2006 | McKenna et al. |
| 7,751,814 B2 | 7/2010 | Cruz et al. |
| 7,920,860 B2 | 4/2011 | Chari et al. |
| 8,145,208 B2 | 3/2012 | Chari et al. |
| 8,233,425 B2 | 7/2012 | Lynch et al. |
| 8,447,292 B2 | 5/2013 | Chari et al. |
| 2009/0096857 A1 | 4/2009 | Frisco et al. |

(Continued)

FOREIGN PATENT DOCUMENTS

| | | |
|---|---|---|
| CN | 106658536 A | 5/2017 |
| EP | 1695457 B1 | 4/2012 |

(Continued)

OTHER PUBLICATIONS

How does WI-FI Internet access in an airplane work, Aug. 18, 2017—https://www.quora.com/How-does-WI-FI-internet-access-in-an-airplane-work?—Quora.

(Continued)

*Primary Examiner* — Charles T Shedrick
(74) *Attorney, Agent, or Firm* — Norton Rose Fulbright Canada LLP (57) ABSTRACT

The present disclosure provides communication systems, switching devices and methods for switching air-to-ground (ATG) antennas of an aircraft. An air-to-ground (ATG) communication unit has a first set of ports for in-flight ATG communication and a second set of ports for ground communication comprising terrestrial communication and accessing fixed base operator (FBO) services. A switching device is configured to switch connectivity of at least one antenna to the first set of ports of the ATG communication unit when the aircraft is in-flight and is configured to switch connectivity of the at least one antenna to the second set of ports when the aircraft is not in-flight.

20 Claims, 7 Drawing Sheets

(56) References Cited

U.S. PATENT DOCUMENTS

2009/0282469 A1* 11/2009 Lynch ................ H04B 7/18506
                                                        726/11
2010/0189089 A1    7/2010 Lynch et al.
2015/0358070 A1   12/2015 Ohm
2016/0205560 A1*   7/2016 Hyslop .............. H04B 7/18506
                                                       455/454
2016/0349361 A1*  12/2016 Schulte .................. G01S 13/79

FOREIGN PATENT DOCUMENTS

EP         3245809 A1    7/2016
WO    WO2016115061 A1    7/2016

OTHER PUBLICATIONS

Rick Mitacek, How Does In-Flight Wi-Fi Really Work?, Nov. 18, 2015.
Vondra et al., Performance Study on Seamless DA2GC for Aircraft Passengers towards 5G, IEEE Communications Magazine, Nov. 2017.
European Patent Office, European Search Report , dated Oct. 29, 2019, Reference No. P190113EP Application No. EP 19179836.2-1219.

* cited by examiner

SYSTEM, DEVICE AND METHOD FOR SWITCHING AIR-TO-GROUND ANTENNAS

CROSS-REFERENCE TO RELATED APPLICATIONS

The present application claims priority under 35 U.S.C. 119(e) of Provisional Patent Application bearing Ser. No. 62/683,926 filed on Jun. 12, 2018, the contents of which are hereby incorporated by reference.

TECHNICAL FIELD

The present disclosure relates generally to aircraft communication, and more specifically to aircraft air-to-ground communication.

BACKGROUND OF THE ART

An air-to-ground (ATG) communication unit can be installed in an aircraft for providing Internet access, multimedia services and Wi-Fi™ connectivity to passengers of the aircraft. The ATG communication unit is typically connected to ATG antennas and the ATG communication unit establishes an ATG connection to a ground network (e.g., GSM, 3G, 4G, LTE) when the aircraft is in-flight. The ATG communication unit is also typically connected to Wi-Fi™ antennas for providing Wi-Fi™ connectivity to passenger devices. The passenger devices may then access the ground network through the ATG communication unit. Typically, ground terrestrial modem (TM) antennas are also connected to the ATG communication unit for use only when the aircraft is on the ground. TM antennas provide the connectivity to the ground network. Typically, a second block of Wi-Fi™ antennas are required for fixed base operator (FBO) ground services when the aircraft is on the ground and can also be used for providing Wi-Fi™ connectivity to passenger devices in-flight.

To reduce the length of coaxial cables from the ATG communication unit to the ATG antennas, the ATG communication unit should be installed as close as possible to ATG antennas. The ATG antennas are typically mounted externally on the underside (also known as the "belly") of the aircraft's fuselage, and may be positioned towards the back of the aircraft. As such, it is desirable to place the ATG communication unit in an Aft equipment bay of the aircraft. However, the Wi-Fi™ and TM antennas should typically be positioned near the window in the middle of cabin in order to provide FBO services. When the ATG communication unit is installed in the Aft equipment bay, coaxial cables would typically have to pass through a feedthrough to connect the Wi-Fi™ and TM antennas to the ATG communication unit. However, in some aircraft, the feedthrough is limited in size and may not allow for passage of coaxial cables from all of the antenna ports of the ATG communication unit to the Wi-Fi™ and TM antennas. Although it may be possible to not use some of the Wi-Fi™ antenna ports of the ATG communication unit in order to reduce the number of coaxial cables needed to pass through the feedthrough, this would affect the quality of Wi-Fi™ service.

Thus, there is a need for improved aircraft communication systems, devices and methods.

SUMMARY

In accordance with a broad aspect, there is provided a communication system for an aircraft. The communication system comprises at least one air-to-ground antenna externally mounted on the aircraft, an air-to-ground communication unit having a first set of ports for in-flight air-to-ground communication with a ground network and a second set of ports for ground communication comprising terrestrial communication with the ground network and for accessing fixed base operator services through a wireless network, and a switching device for connecting the at least one air-to-ground antenna to one of the first set of ports and the second set of ports, the switching device configured to switch connectivity of the at least one air-to-ground antenna to the first set of ports when the aircraft is in-flight.

In some embodiments, the switching device is configured to switch connectivity of the at least one air-to-ground antenna to the first set of ports when a weight-off-wheels condition of the aircraft is met.

In some embodiments, the switching device is configured to switch connectivity of the at least one air-to-ground antenna to the first set of ports when the aircraft is in-flight and has an altitude that exceeds a given altitude.

In some embodiments, the given altitude is 10,000 feet.

In some embodiments, the communication system further comprises an access point connected to the air-to-ground communication unit for providing wireless communication access to passenger devices.

In some embodiments, the second set of ports comprises terrestrial modem ports for terrestrial communication with the ground network and Wi-Fi™ ports for accessing the fixed-base operator services.

In some embodiments, the switching device is a commutator.

In some embodiments, the switching device comprises at least one coaxial relay.

In some embodiments, the at least one air-to-ground antenna comprises two antenna units each comprising four antennas, each antenna unit having four coaxial ports connecting the four antennas to the switching device, wherein the first set of ports comprises eight air-to-ground communication ports, and wherein the second set of ports comprises two terrestrial modem ports for terrestrial communication with the ground network and three Wi-Fi™ ports for accessing the fixed-base operator services.

In accordance with a broad aspect, there is provided a switching device for use with an air-to-ground communication unit of an aircraft. The switching device comprises a first set of ports for connecting to at least one air-to-ground antenna mounted externally on the aircraft, a second set of ports for connecting to in-flight air-to-ground communication ports of the air-to-ground communication unit, the air-to-ground communication ports for air-to-ground communication with a ground network, a third set of ports for connecting to ground communication ports of the air-to-ground communication unit, the ground communication ports for terrestrial communication with the ground network and for accessing fixed base operator services through a wireless network, and a switching mechanism for connecting the at least one air-to-ground antenna to one of the in-flight air-to-ground communication ports and the ground communication ports, the switching mechanism configured to switch connectivity of the at least one air-to-ground antenna to the in-flight air-to-ground communication ports when the aircraft is in-flight.

In some embodiments, the switching device is configured to switch connectivity of the at least one air-to-ground antenna to the in-flight air-to-ground communication port when a weight-off-wheels condition of the aircraft is met.

In some embodiments, the switching device is configured to switch connectivity of the at least one air-to-ground antenna to in-flight air-to-ground communication port when the aircraft is in-flight and has an altitude that exceeds a given altitude.

In some embodiments, the given altitude is 10,000 feet.

In some embodiments, the third set of ports are for connecting to terrestrial modem ports and Wi-Fi™ communication ports of the air-to-ground communication unit.

In some embodiments, the switching device is a commutator.

In some embodiments, the switching device comprises at least one coaxial relay.

In accordance with a broad aspect, there is provided a method for switching at least one air-to-ground antenna of an aircraft between in-flight air-to-ground communication and ground communication. The method comprises receiving an in-flight condition indicative of when the aircraft is in-flight, communicatively connecting the at least one air-to-ground antenna to a first set of ports of an air-to-ground communication unit when the in-flight condition of the aircraft is met, the first set of ports for in-flight air-to-ground communication with a ground network, communicatively connecting the at least one air-to-ground antenna to a second set of ports of the air-to-ground communication unit when the in-flight condition of the aircraft is not met, the second set of ports for terrestrial communication with the ground network and for accessing fixed base operator services through a wireless network.

In some embodiments, the in-flight condition is a weight-off-wheels condition of the aircraft.

In some embodiments, the in-flight condition is met when the aircraft exceeds a given altitude.

In some embodiments, the given altitude is 10,000 feet.

Features of the systems, devices and methods described herein may be used in various combinations and may also be used for a computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Systems, devices and methods for switching air-to-ground (ATG) antennas of an aircraft are described herein. A switching device is connected to the ATG antennas and to different ports of an ATG communication unit. The switching device is configured to switch communicative connectivity of the ATG antennas to different ports of the ATG communication unit based on when the aircraft is in-flight or not in-flight.

Figure 1:
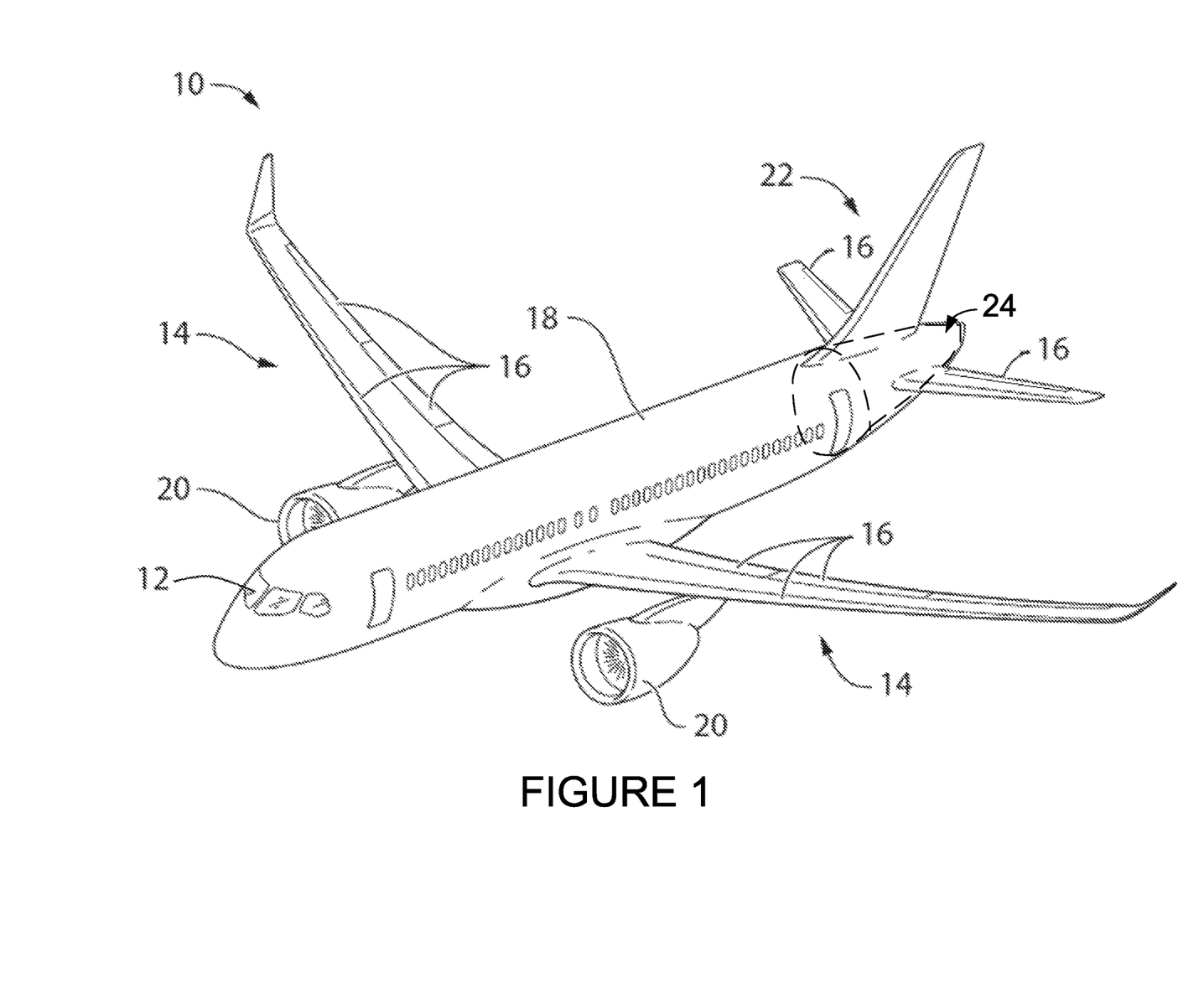
FIG. 1 is a diagram of an example aircraft.

With reference to FIG. 1, an exemplary aircraft 10 is shown. The aircraft 10 may be any type of aircraft such as a propeller plane, jet plane, turbojet plane, turbo-propeller plane, and the like. For example, the aircraft 10 may be a narrow-body, twin-engine jet airliner. The aircraft 10 may be a fixed-wing aircraft. The aircraft 10 may comprise flight control components 16, wings 14, fuselage 18, engines 20 and empennage 22 of known or other type. The flight control components 16 may comprise ailerons, elevators, and a rudder. In the embodiment illustrated, a single engine 20 is mounted under each of the wings 14. However, two or more engines 20 may be mounted to one or more of wings 14. Alternatively, or in addition, one or more engines 20 may be mounted to fuselage 18 or be installed on the aircraft 10 in any suitable manner. A cockpit 12 may be positioned at any suitable location on the aircraft 10, for example at a front portion of the fuselage 18. The cockpit 12 is configured for accommodating one or more pilots who control the operation of the aircraft 10 by way of one or more operator controls. An equipment bay 24 may be positioned at any suitable location on the aircraft 10, for example at a rear portion of the fuselage 18 and which is referred to as an "Aft equipment bay".

Figure 2A:
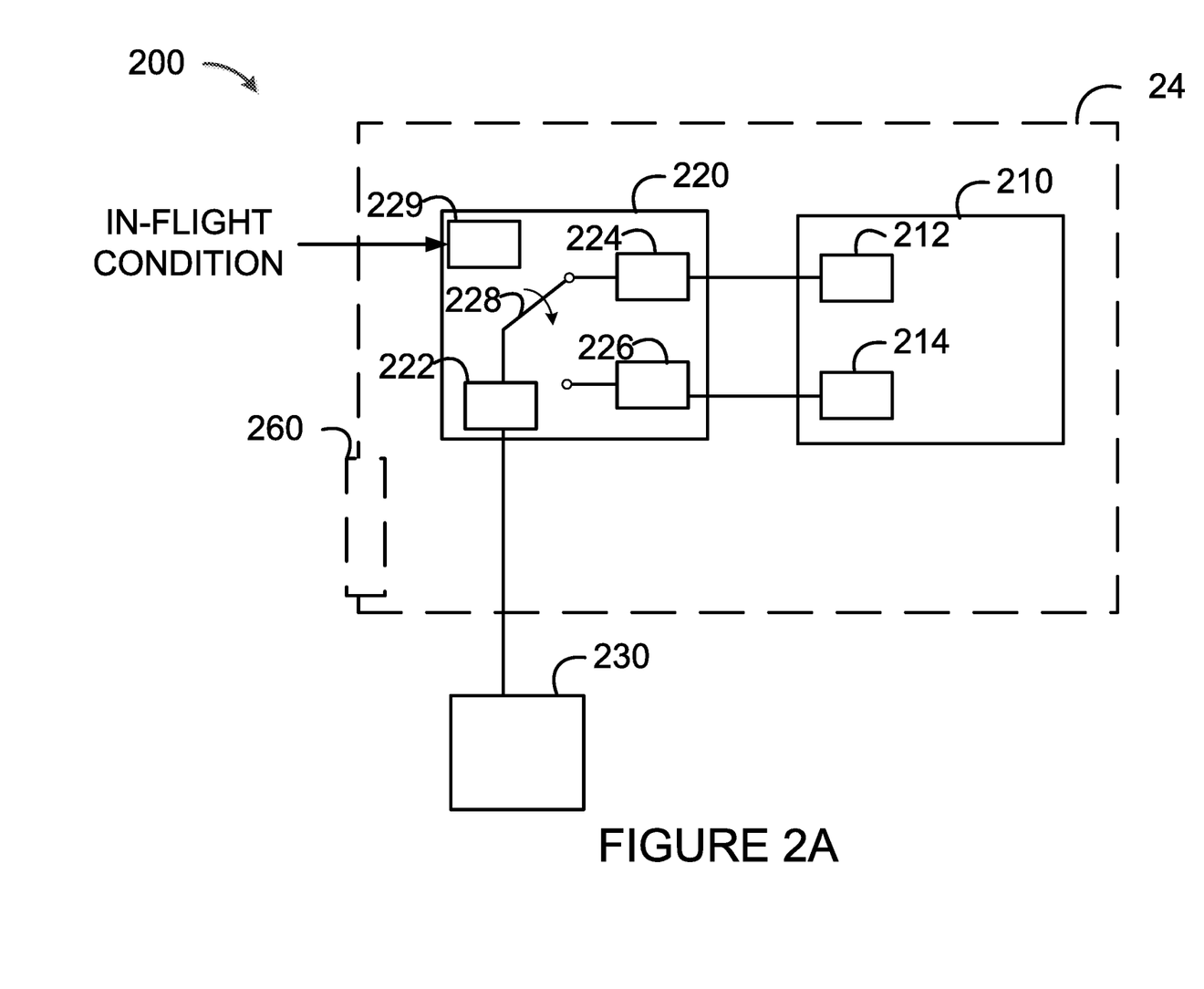
FIG. 2A is a block diagram of a communication system in accordance with an embodiment.

With reference to FIG. 2A, there is illustrated a communication system 200 for an aircraft, such as the aircraft 10 of FIG. 1. While the communication system 200 is described herein with reference to the aircraft 10, the communication system 200 may be applied to other types of aircraft. The communication system 200 comprises an ATG communication unit 210. The ATG communication unit 210 is for providing ATG communication to the aircraft 10 by connecting to a ground network when the aircraft 10 is in-flight. The ground network may be any suitable network including, but not limited to, a cellular network (e.g., GSM, UMTS, 3G, 4G, LTE, etc.), a wireless local area network (e.g., Wi-Fi™, etc.), a wireless ad hoc network, and a wireless metropolitan area networks (e.g., WiMax, etc.). The ATG communication unit 210 may be any suitable ATG communication unit and/or system for ATG communication. For example, the ATG communication unit 210 may be an ATG system supplied by GoGo Business Aviation™. In some embodiments, the ATG communication unit 210 is a 4G ATG communication unit.

The ATG communication unit 210 comprises a first set of ports 212 for in-flight ATG communication with the ground network and a second set of ports 214 that comprise port(s) for ground communication comprising terrestrial communication with the ground network and for accessing fixed base operator (FBO) services when the aircraft 10 is on the ground. As used herein, the term FBO refers to an organization that is granted the right by an airport to operate at the airport. Typically, an FBO provides aeronautical services such as fueling, hungering, tie-down and parking, aircraft rental, aircraft maintenance, flight instruction and/or any other suitable services. FBO services described herein refers to data services provided by an FBO and which are accessible by a specific wireless connection. The data services may include a content update of the multimedia services that may be provided by the ATG communication unit 210 and/or by a communication device connected to the ATG communication unit 210. The communication device may comprise the AVANCE L5™, AVANCE L5i™, AVANCE L3™, UCS-5000™ provided by GoGo Business Aviation™ or any other suitable communication system. The ATG communication unit 210 and/or the communication device may provide the multimedia services to passenger devices and/or aircraft in-flight entertainment units that connect to the ATG communication unit 210 and/or the communication device. The multimedia services may include one or more of movies, TV shows, news, a flight tracker, flight progress information, destination weather, screen sharing, in-cabin file transfer, flight support services and/or any other suitable services. The content update may be automatic such that the ATG communication unit 210 and/or communication device automatically accesses the FBO services over the specific wireless connection. The FBO services may comprise cloud services provided by GoGo Business Aviation™. The FBO services may be accessed by connecting to a specific W-Fi network provided by the FBO offering the FBO services. The term a "set of ports", as used herein, refers to one or more ports. The number of ports of the first set of ports 212 and the second set of ports 214 may vary depending on practical implementations. The ATG communication unit 210 may comprise other input and/or output ports, connections, and/or interfaces.

The communication system 200 comprises a switching device 220. The switching device 220 is for communicatively connecting at least one antenna 230 to one of the first set of ports 212 and the second set of ports 214 of the ATG communication unit 210. The switching device 220 is configured to selectively switch connection of the at least one antenna 230 to the first set of ports 212 of the ATG communication unit 210 when the aircraft 10 is in-flight and is configured to selectively switch connectivity of the at least one antenna 230 to the second set of ports 214 of the ATG communication unit 210 when the aircraft 10 is not in-flight. In some embodiments, the switching device 220 is configured to switch connectivity of the at least one antenna 230 to the first set of ports 212 when a weight-off-wheels condition of the aircraft 10 is met. In some embodiments, the switching device 220 is configured to switch connectivity of the at least one antenna 230 to the first set of ports 212 when the aircraft 10 is in-flight and has an altitude that exceeds a given altitude. For example, the given altitude may be 10,000 feet. Commercial aircraft generally are only below an altitude of 10,000 feet while departing from or approaching an airport. For this reason, 10,000 feet may be selected as the given altitude for switching to ATG communication. The given altitude may vary depending on practical implementations.

In accordance with an embodiment, the switching device 220 switches connection of the at least one antenna 230 between the first set of ports 212 and the second set of ports 214 of the ATG communication unit 210 as a function of an in-flight condition of the aircraft 10 that is indicative that the aircraft 10 is in-flight. Accordingly, the switching device 220 may be configured to switch connectivity of the at least one antenna 230 to the first set of ports 212 of the ATG communication unit 210 when the in-flight condition of the aircraft 10 is met. Similarly, the switching device 220 may be configured to switch connectivity of the at least one antenna 230 to the second set of ports 214 when the in-flight condition of the aircraft 10 is not met. In some embodiments, the in-flight condition is the weight-off-wheels condition of the aircraft. In some embodiments, the in-flight condition is met when the aircraft 10 exceeds the given altitude. Other types of in-flight conditions are contemplated.

The implementation of the switching device 220 may vary depending on practical implementations. The switching device 220 may be comprised of any suitable electric device(s). For example, the switching device 220 may be a commutator. By way of another example, one or more coaxial relays may be used. Other configurations of the switching device 220 are contemplated.

In the illustrated embodiment, the switching device 220 comprises a first set of ports 222 for connecting to the at least one antenna 230. To differentiate between the ports of the switching device 220 and the ports of the ATG communication unit 210, the first set of ports 212 of the ATG communication unit 210 are referred to herein as the "ATG communication ports" and the second set of ports 214 of the ATG communication unit 210 are referred to herein as the "ground communication ports". The switching device 220 comprises a second set of ports 224 for connecting to the ATG communication ports 212 and a third set of ports 226 for connecting to the ground communication ports 214. The switching device 220 comprises a switching mechanism 228 for communicatively connecting the at least one antenna to one of the ATG communication ports 212 and the ground communication ports 214, depending on the in-flight condition. In the illustrated embodiment, the switching device 220 has a conditional input port 229 which is used for selecting a position of the switching mechanism 228. For example, an input signal may be received at the conditional input port 229 from an aircraft computer configured to provide the in-flight condition. The input signal may be a discrete input of one of two values (e.g., −1 V or +1 V; 0 V or +5 V; 0 V or 28V; 0 or 1; ground or open; high impedance or low impedance; or the like) to indicate that the in-flight condition is met or not met. Accordingly, the switching mechanism 228 is configured to switch its position such that it communicatively connects the at least one antenna 230 to the ATG communication ports 212 when the in-flight condition of the aircraft 10 is met. Similarly, switching mechanism 228 is configured to switch its position such that it communicatively connects the at least one antenna 230 to the ground communication ports 214 when the in-flight condition of the aircraft 10 is not met.

The connection(s) of the switching device 220 to the at least one antenna 230 may be made by use of one or more electrical cables. Similarly, the connections between the switching device 220 and the ATG communication unit 210 may be made by use of electrical cables. The electrical cables used for the various connections may be coaxial cables.

The at least one antenna 230 may be any suitable antenna (s). The at least one antenna 230 may be an antenna unit that comprises a plurality of antennas. For example, antennas of different types and/or sizes may be configured to operate in specific frequency bands. In accordance with an embodiment, the at least one antenna 230 is at least one ATG antenna mounted externally on the aircraft 10. For example, the at least one antenna 230 is mounted externally on the underside (also known as the "belly") of the aircraft's fuselage 18. One or more antenna units may be used, where each antenna unit comprise one or more antennas.

In accordance with an embodiment, the ATG communication unit 210 and the switching device 220 are provided in the Aft equipment bay 24 of the aircraft 10. It should be appreciated that such a configuration may eliminate the need to pass the electrical cables through a feedthrough 260 of the Aft equipment bay 24 to connect the ATG communication unit 210 to wireless access point antennas (e.g., Wi-Fi™ antennas).

Figure 2B:
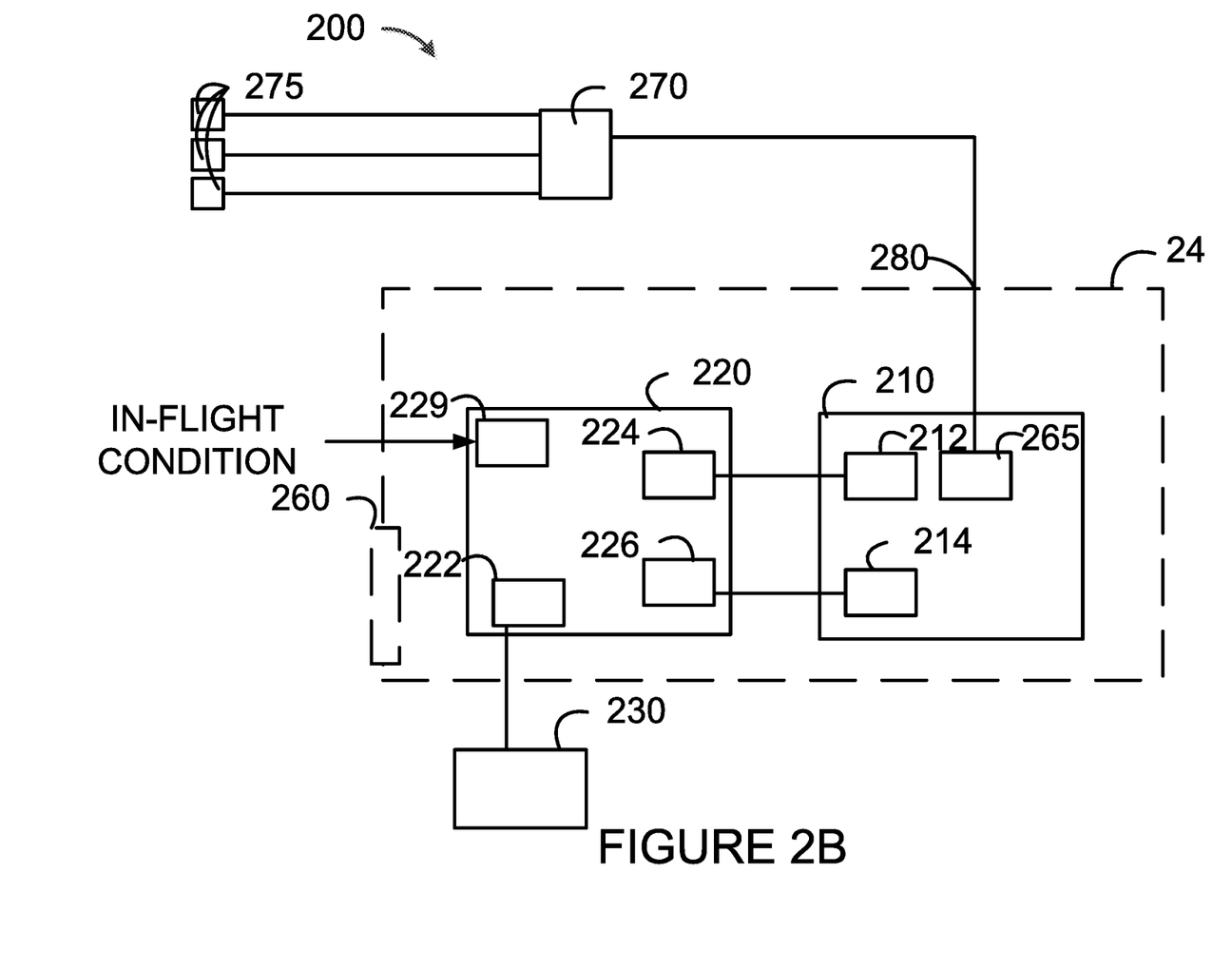
FIG. 2B is a block diagram of the communication system of FIG. 2A where an access point is connected to an air-to-ground communication unit in accordance with an embodiment.

With reference to FIG. 2B, the communication system 200 is illustrated where the ATG communication unit 210 is connected to an access point 270. The access point 270 is any suitable networking hardware device for providing wireless communication access. The access point 270 may be referred to as a "wireless access point". The access point 270 may be a hub, a switch, a router and/or any suitable networking hardware equipment. In some embodiments, the access point 270 is a Satcom Direct™ (SD) Wi-Fi™ Hub. The access point 270 is connected to wireless access point antennas 275. For example the wireless access point antennas 275 may be Wi-Fi™ antennas. While three (3) wireless access point antennas 275 are shown, the number of wireless access point antennas may be more or less than three (3). Wireless access point antennas 275 are connected to the access point 270 by electrical cables (e.g., coaxial cables). Alternatively, the access point 270 may comprise the wireless access point antennas 275.

The access point 270 is connected to the ATG communication unit 210 by one or more electrical cables. In accordance with a specific and non-limiting example of implementation, an Ethernet cable is used to connect the access point 270 to the ATG communication unit 210. The access point 270 may accordingly provide wireless communication access to passenger devices (e.g, cell-phones, portable computers, tablets, and/or the like having wireless networking capabilities). Thus, the passenger devices may connect to the ground network via the ATG communication unit 210. While a single access point 270 is illustrated in FIG. 2B, in some embodiments multiple access points 270 may be connected to the ATG communication unit 210. In this example, the Ethernet cable is passed via a pressure bulkhead disconnect 280. By passing the Ethernet cable via the pressure bulkhead disconnect 280, use of passing electrical cables (e.g., coaxial cables) through the feedthrough 260 of the Aft equipment bay 24 to wireless access point antennas (e.g., Wi-Fi™) in other parts of the aircraft 10 may be eliminated. It should be appreciated that the installation of Ethernet cable is typically simpler and less expensive than the installation of coaxial cable.

Figure 2C:
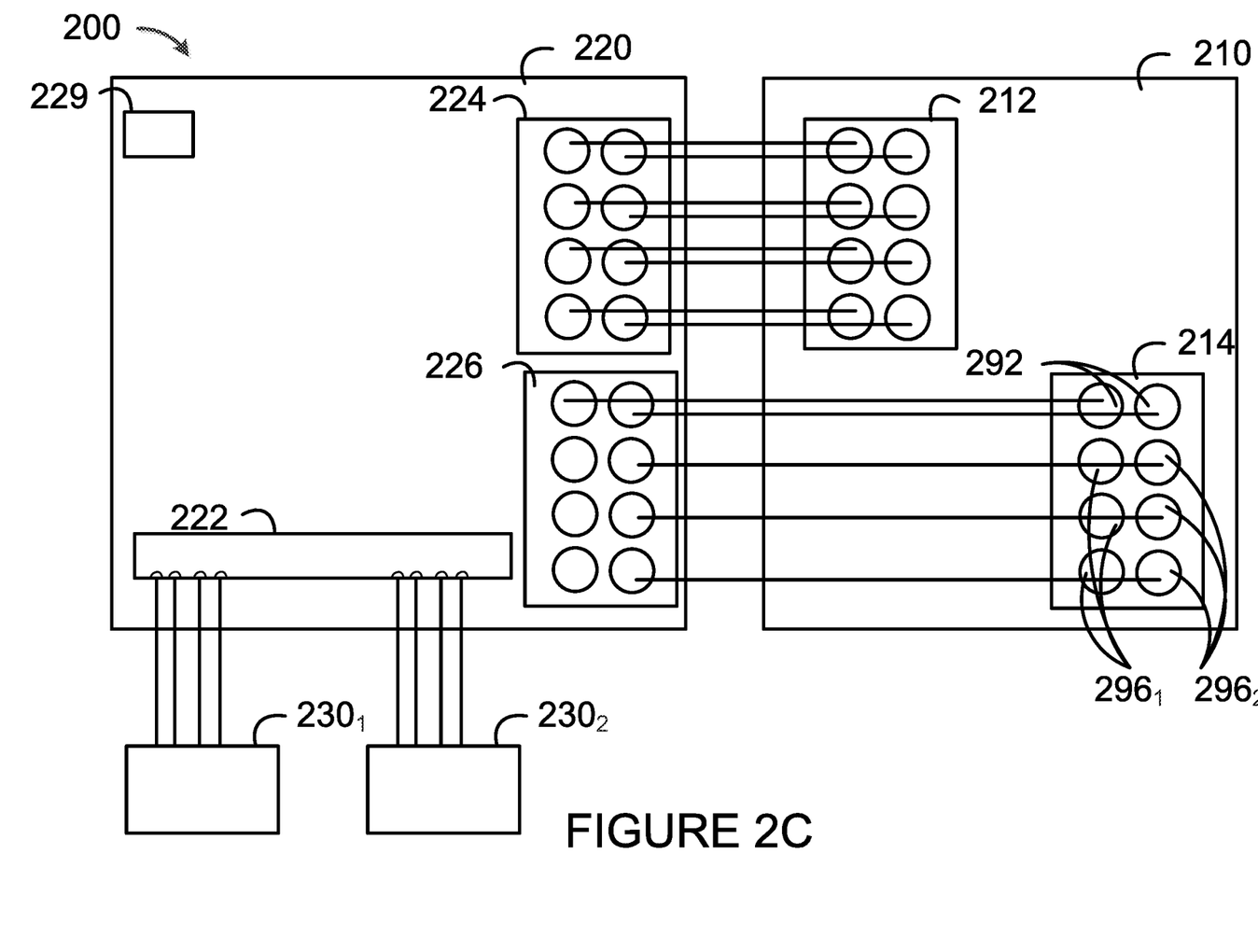
FIG. 2C is a block diagram of the communication system of FIG. 2A illustrating an example of port connections between an air-to-ground communication unit, a switching device, and air-to-ground antennas in accordance with an embodiment.

With reference to FIG. 2C, the communication system 200 is illustrated in accordance with a specific and non-limiting example of implementation. In this example, the ATG communication unit 210 comprises eight (8) ATG communication ports 212 and the second set of ports 214 are comprised of two (2) terrestrial modem (TM) ports 292 and six (6) wireless communication ports $296_1$ and $296_2$. Three (3) wireless communication ports $296_1$ may be Wi-Fi™ ports for providing Wi-Fi™ communication connectivity for passengers in-flight and/or on the ground. Three (3) wireless communication ports $296_2$ may be Wi-Fi™ ports for providing connectivity for FBO services on the ground and supplemental communication connectivity to passenger devices in-flight (e.g., for providing Wi-Fi™ connectivity to passenger devices in-flight). That is, when the aircraft 10 is in-flight, and the FBO service is not being used, the three (3) wireless communication ports $296_2$ may be used for Wi-Fi™ access by passenger devices. It should be appreciated that, in this example, the three (3) wireless communication ports $296_1$ that are dedicated solely for Wi-Fi™ access are not used (e.g., not connected to the switching device 220).

Figure 2D:
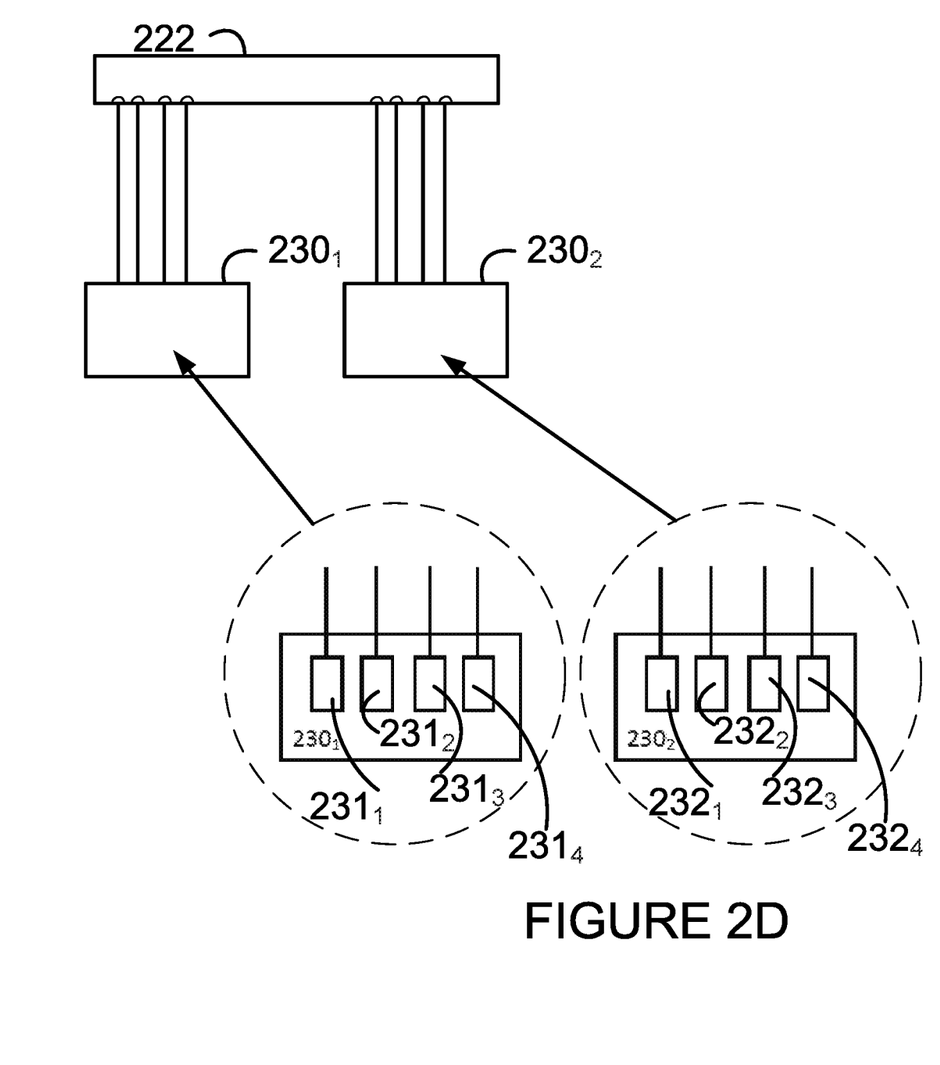
FIG. 2D is a block diagram of the air-to-ground antennas of FIG. 2C where multiple antennas are provided in two antenna units in accordance with an embodiment.

The maximum number of ports of each of the first, second and third sets of ports 222, 224, 226 of the switching device 220 corresponds in number with available antennas of antenna units $230_1$ and $230_2$. In this example, the maximum number of ports for the sets of ports 222, 224, 226 is eight (8). With additional reference to FIG. 2D, the antenna units $230_1$ and $230_2$ each have four (4) internal separated antennas $231_1$, $231_2$, $231_3$ and $231_4$, and $232_1$, $232_2$, $232_3$ and $232_4$, respectively. Each of the antennas $231_1$, $231_2$, $231_3$, $231_4$ and $232_1$, $232_2$, $232_3$ and $232_4$ are connected by a separate coaxial cable to a corresponding port of the first set of ports 222. The number of antennas in each antenna unit $230_1$, $230_2$ and/or the number of antenna units $230_1$, $230_2$ may vary depending on practical implementations. Each of the antenna units $230_1$ and $230_2$ may comprise an aerodynamic case for external mounting on the aircraft 10.

In some embodiments, the ATG communication unit 210 comprises one or more wireless network cards each supporting a number of antennas. For example, the ATG communication unit 210 may comprise two (2) wireless network cards, where each wireless network card supports three (3) wireless access point antennas (e.g., Wi-Fi™ antennas). In some embodiments, a first network card is used to provide wireless network access (e.g., Wi-Fi™ access) to passenger devices in-flight and/or on ground. The first network card may comprise the communication ports $296_1$. In some embodiments, a second network card is used for fixed base operator (FBO) services on the ground and supplemental communication connectivity to passenger devices in-flight (e.g., for providing Wi-Fi™ connectivity to passenger devices in-flight). The second network card may comprise the communication ports $296_2$. In some embodiments, three (3) antennas are directly connected to the ATG communication unit 210 (or connected to the access point 270 as shown in FIG. 2B) for providing wireless access to passenger devices (e.g., Wi-Fi access) and the switching device 220 is configured as described herein. It should be appreciated that such a configuration may avoid directly connecting one or more antennas to the ATG communication unit 210 for providing FBO services and avoid directly connecting one or more ground communication antennas to the ATG communication unit 210 for providing FBO services and Internet access on ground.

In some embodiments, to prevent the coax cable installation via the feedthrough 260, the wireless access point 270 is used. However, the terrestrial communication with the ground network and Wi-Fi via the second radio card cannot be provided by the wireless access point 270. Rather, in this embodiment, the connection is made with the ATG communication unit 210. This is done by reusing the available ATG antennas $230_1$ $230_2$ to use them for the terrestrial communication with the ground network and Wi-Fi via the second radio card, because the ATG antennas $230_1$ $230_2$ stay connected to the ATG communication unit 210. In some embodiments, this reduces the number of coaxial cables to eight (8) coax cables instead of sixteen (16) coax cables.

Figure 3:
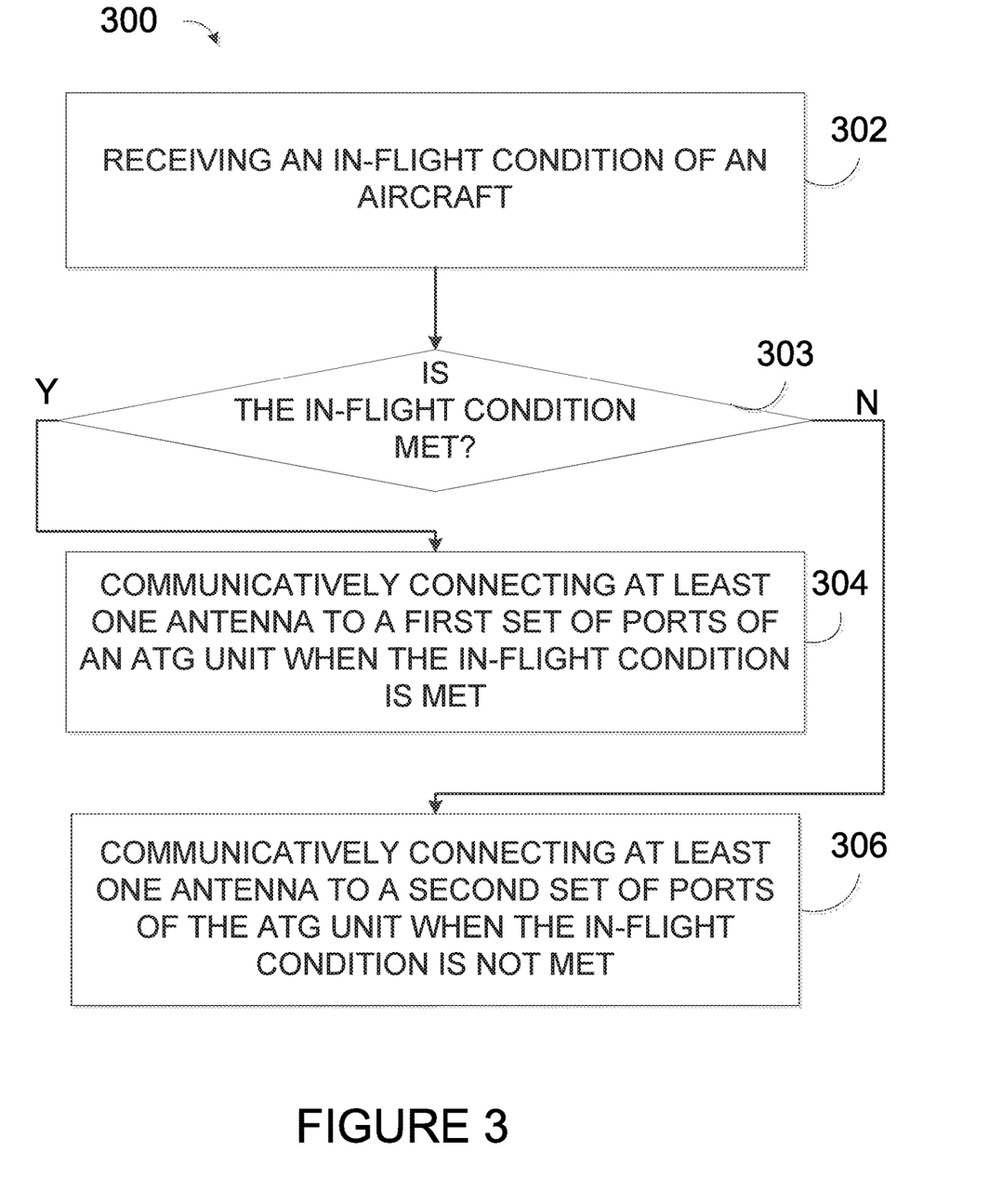
FIG. 3 is a flowchart of a method for switching air-to-ground antennas in accordance with an embodiment.

With reference to FIG. 3, there is illustrated a flowchart of an example method 300 for switching at least one antenna 230 of the aircraft 10 between in-flight ATG communication and ground communication. While the method 300 is described herein with reference to the aircraft 10, the method 300 may be applied to other types of aircraft. At step 302, the in-flight condition indicative of when the aircraft 10 is in-flight is received. The received in-flight condition may be a discrete input of one of two values (e.g., −1 V or +1 V; 0 V or +5 V; 0 V or 28V; 0 or 1; ground or open; high impedance or low impedance; or the like) provided by an aircraft computer or control system. The aircraft computer or control system may determine the in-flight condition by monitor the in-flight condition either dynamically in real time when needed, regularly in accordance with any predetermined time interval, or irregularly. The in-flight condition may be actively retrieved, or may be passively received from one or more measuring devices comprising one or more sensors for measuring the in-flight condition. For example, one or more sensors may be used for detecting the weight-off-wheels condition (or alternatively a weight-on-wheels condition). By way of another example, one or more sensors may be used to obtain the altitude of the aircraft 10. At step 303, the method 300 detects whether the in-flight condition is met or not met. This may include detecting which one of two discrete input values is present. At step 304, the at least one antenna 230 is communicatively connected to the first set of ports 212 of the ATG communication unit 210 when the in-flight condition of the aircraft is met. In other words, in response to detecting that the in-flight condition is met, the method 300 switches the communicative connection of the at least one antenna 230 to the first set of ports 212 of the ATG communication unit 210. At step 306, the at least one antenna 230 is communicatively connected to the second set of ports 214 of the ATG communication unit 210 when the in-flight condition of the aircraft is not met. In other words, in response to detecting that the in-flight condition is not met, the method 300 switches the connection of the at least one antenna 230 to the second set of ports 214 of the ATG communication unit 210.

Figure 4:
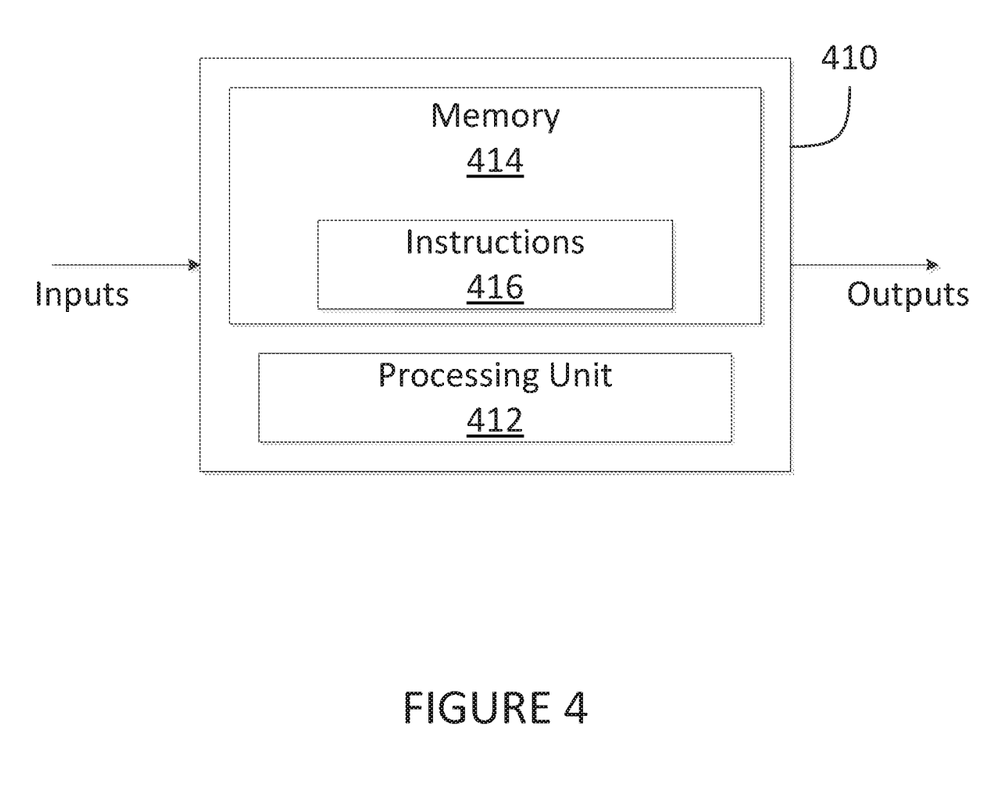
FIG. 4 is a block diagram of an example computing device for implementing the method of FIG. 3.

With reference to FIG. 4, the control system and/or aircraft computer for providing the in-flight condition of the aircraft may be implemented by a computing device 410. The computing device 410 may receive inputs from the one or more measuring devices comprising the one or more sensors for measuring the in-flight condition. The computing device 410 may be configured to detect the in-flight condition and outputting a control signal to the switching device 220. The computing device 410 comprises a processing unit 412 and a memory 414 which has stored therein computer-executable instructions 416. The processing unit 412 may comprise any suitable devices configured to provide the in-flight condition, when executed by the computing device 410 or other programmable apparatus. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof. The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

The above description is meant to be exemplary only and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems, devices and methods for switching ATG antennas of an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments, Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A communication system for an aircraft, the communication system comprising:
    at least one air-to-ground antenna externally mounted on the aircraft;
    an air-to-ground communication unit having a first set of ports for in-flight air-to-ground communication with a ground network and a second set of ports for ground communication comprising terrestrial communication with the ground network and for accessing fixed base operator services through a wireless network;
    a computing device configured to receive inputs from at least one sensor for measuring an in-flight condition; and
    a switching device for connecting the at least one air-to-ground antenna to one of the first set of ports and the second set of ports,
    wherein the computing device is configured to detect the in-flight condition and output a control signal indicative of the in-flight condition to the switching device, and the switching device is configured to switch connectivity of the at least one air-to-ground antenna to the first set of ports upon reception of the control signal.

2. The communication system of claim 1, wherein the signal indicative of the flight condition is derived from a weight-off-wheels condition of the aircraft is met.

3. The communication system of claim 1, wherein the signal indicative of the flight condition is derived from an altitude measurement sensor and the switching device is configured to switch connectivity of the at least one air-to-ground antenna to the first set of ports when the aircraft is in-flight and has an altitude that exceeds a given altitude.

4. The communication system of claim 3, wherein the given altitude is 10,000 feet.

5. The communication system of claim 1, further comprising an access point connected to the air-to-ground communication unit for providing wireless communication access to passenger devices.

6. The communication system of claim 1, wherein the second set of ports comprises terrestrial modem ports for terrestrial communication with the ground network and Wi-Fi™ ports for accessing the fixed-base operator services.

7. The communication system of claim 1, wherein the switching device is a commutator.

8. The communication system of claim 1, wherein the switching device comprises at least one coaxial relay.

9. The communication system of claim 1 wherein the at least one air-to-ground antenna comprises two antenna units each comprising four antennas, each antenna unit having four coaxial ports connecting the four antennas to the switching device, wherein the first set of ports comprises eight air-to-ground communication ports, and wherein the second set of ports comprises two terrestrial modem ports for terrestrial communication with the ground network and three Wi-Fi™ ports for accessing the fixed-base operator services.

10. A switching device for use with an air-to-ground communication unit of an aircraft, the switching device comprising:
    a first set of ports for connecting to at least one air-to-ground antenna mounted externally on the aircraft;
    a second set of ports for connecting to in-flight air-to-ground communication ports of the air-to-ground communication unit, the air-to-ground communication ports for air-to-ground communication with a ground network;
    a third set of ports for connecting to ground communication ports of the air-to-ground communication unit, the ground communication ports for terrestrial communication with the ground network and for accessing fixed base operator services through a wireless network;
    an interface to a computing device configured to receive inputs from at least one sensor for measuring an in-flight condition; and
    a switching mechanism for connecting the at least one air-to-ground antenna to one of the in-flight air-to-ground communication ports and the ground communication ports,
    wherein the computing device is configured to detect the in-flight condition and output a control signal indicative of the in-flight condition to the switching mechanism and the switching mechanism is configured to switch connectivity of the at least one air-to-ground antenna to the in-flight air-to-ground communication ports upon reception of the control signal.

11. The switching device of claim 10, wherein the signal indicative of the flight condition is derived from a weight-off-wheels condition of the aircraft.

12. The switching device of claim 10, wherein the signal indicative of the flight condition is derived from an altitude measurement sensor and the switching device is configured to switch connectivity of the at least one air-to-ground antenna to in-flight air-to-ground communication port when the aircraft is in-flight and has an altitude that exceeds a given altitude.

13. The switching device of claim 12, wherein the given altitude is 10,000 feet.

14. The switching device of claim 10, wherein the third set of ports are for connecting to terrestrial modem ports and Wi-Fi™ communication ports of the air-to-ground communication unit.

15. The switching device of claim 10 wherein the switching device is a commutator.

16. The switching device of claim 10 wherein the switching device comprises at least one coaxial relay.

17. A method for switching at least one air-to-ground antenna of an aircraft between in-flight air-to-ground communication and ground communication, the method comprising:
    detecting an in-flight condition through a sensor measurement and outputting a control signal indicative of the in-flight condition;
    receiving the control signal;
    communicatively connecting, based on the control signal, the at least one air-to-ground antenna to a first set of ports of an air-to-ground communication unit when the in-flight condition of the aircraft is met, the first set of ports for in-flight air-to-ground communication with a ground network; and
    communicatively connecting, based on the control signal, the at least one air-to-ground antenna to a second set of ports of the air-to-ground communication unit when the in-flight condition of the aircraft is not met, the second set of ports for terrestrial communication with the ground network and for accessing fixed base operator services through a wireless network.

18. The method of claim 17, wherein the in-flight condition is a weight-off-wheels condition of the aircraft.

19. The method of claim 17, wherein the in-flight condition is met when the aircraft exceeds a given altitude.

20. The method of claim 19, wherein the given altitude is 10,000 feet.

* * * * *